Figure 4:
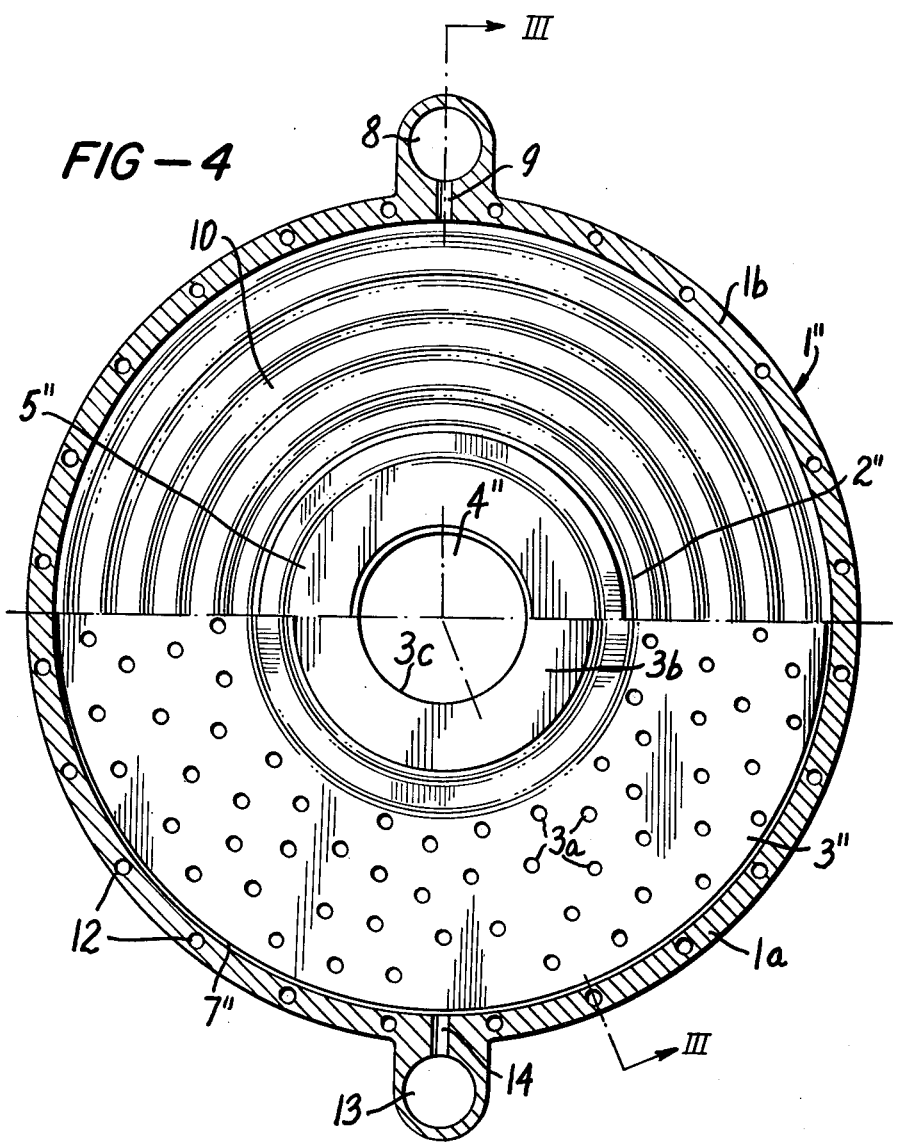

United States Patent [19]

Beaujean

[11] 4,157,748
[45] Jun. 12, 1979

[54] APPARATUS FOR CONTROLLED TRANSMISSION OF TORQUE BY MEANS OF A HYDRAULIC FLUID

[75] Inventor: Joseph M. E. Beaujean, Venlo, Netherlands

[73] Assignee: Bogey B.V., Venlo, Netherlands

[21] Appl. No.: 808,666

[22] Filed: Jun. 21, 1977

[30] Foreign Application Priority Data

Jun. 23, 1976 [NL] Netherlands ................... 7606849

[51] Int. Cl.² ............................................. F16D 35/00
[52] U.S. Cl. ................................ 192/58 B; 192/113 B
[58] Field of Search ............... 192/58 B, 58 C, 113 B, 192/82 T

[56] References Cited

U.S. PATENT DOCUMENTS

| Re. 25,481 | 11/1963 | Weir | 192/58 B |
|---|---|---|---|
| 923,565 | 6/1909 | Newcomb | 192/58 B |
| 2,852,118 | 9/1958 | Lacroix, Jr. et al. | 192/113 B |
| 3,404,832 | 10/1968 | Sutaruk | 192/58 B X |
| 3,458,020 | 7/1969 | Lutz | 192/58 B |
| 3,498,431 | 3/1970 | Sutaruk | 192/58 C X |
| 3,534,842 | 10/1970 | Davison, Jr. | 192/113 B |
| 3,651,909 | 3/1972 | Zautaszwili | 192/113 B X |
| 3,688,884 | 9/1972 | Perrin et al. | 192/58 B |

FOREIGN PATENT DOCUMENTS

448977 9/1927 Fed. Rep. of Germany .......... 192/58 B

*Primary Examiner*—Allan D. Herrmann
*Attorney, Agent, or Firm*—Brumbaugh, Graves, Donohue & Raymond

[57] ABSTRACT

A transmission apparatus utilizes the shear resistance in the laminar flow of hydraulic fluid in the active gap between the opposing surfaces of the transmission plates in order to control the transmission of torque. The apparatus comprises at least one plate having a perforated active surface and provided with at least one flowpath away from the active surface, the flowpath connecting the perforations with the non-active space around the perforated plate, and at least one corresponding plate having a non-perforated active surface spaced apart from the active surface of the perforated plate by an active gap. The active gap, the perforations, and the flowpath are arranged and dimensioned such that the resistance to radial flow in the gap is several times the resistance to flow through the perforations and the flowpath in order to create and maintain in the gap at a tangential laminar flow without an effective radial flow component. The apparatus also has means for supplying and withdrawing fluid in the gap such that the transmitted torque can be externally controlled by influencing the amount of hydraulic fluid present.

15 Claims, 6 Drawing Figures

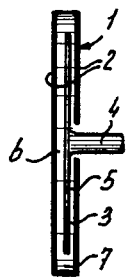
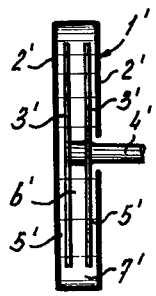
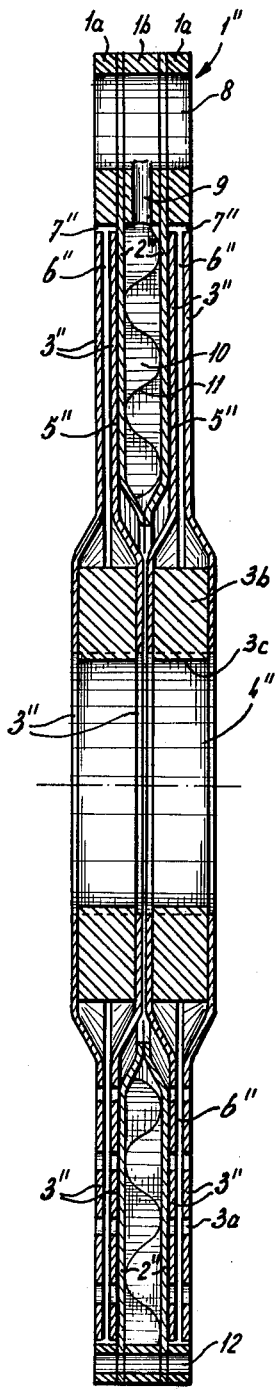

APPARATUS FOR CONTROLLED TRANSMISSION OF TORQUE BY MEANS OF A HYDRAULIC FLUID

The invention relates to a transmission apparatus capable of controlled transmission of torque by making use of the shear resistance in a laminar flow of hydraulic fluid in the (active) gap between the opposing (active) surfaces of two mutually rotating parallel bodies, like plates, in which one plate has a perforated active surface and is fitted with at least one flowpath distant from the active plate-surface, which flowpath connects with perforations with the inactive part of the space around said plate, and in which the other plate has a non-perforated active surface.

Apparatus of this kind are known in a great number of different forms. They all have in common that basically no contact should take place between mutually moving bodies, in order to avoid mechanical wear. Since for the transmission of torque always a certain slip or relative motion should occur between both bodies which transmit the torque to each other, there is always generated a certain amount of heat in the fluid due to the shear between the molecules. In many cases an internal recirculation in itself or an external circulation of the hydraulic fluid is adopted to remove the friction heat. The characteristics of the different types of couplings, depending on the type and the physical principles on which they base their action, are strongly different. Certain types show an automatic control as function of the transmitted torque or of the number of revolutions per unit of time. Others characterize themselves by an externally governed control.

The present invention looks to a type in which the torque is controllably transmitted in such a way between two bodies that the torque changes linearly in response to relative fast changes in relative speed, after which this torque stabilises itself on a value which—within a large field of speeds—is generally independent of the relative speed and controllably at will, whenever the relative speed stabilizes itself as a function of time. Furthermore the transmitted torque should rapidly be controlled from outside between an absolute disengagement of the relative rotation of the two bodies and a maximum engagement. Finally the apparatus should be small in size and of utmost simplicity.

In general the torque transmission capacity depends on the relative speed between the bodies transmitting said torque. In the case of hydrodynamic couplings this relation is more than square, in case of viscous couplings or viscous brakes the relation is approximately linear. Control circuits are known which are capable to influence said dependence, for instance by making the torque transmission independent from the slip.

In the class of viscous couplings or viscous brakes the torque is transmitted by shear forces acting in a laminar flow of viscous fluid in a narrow gap between two bodies mutually rotating. A characteristic of this type of apparatus consists in the fact that the transmitted torque rises linear with the slip between both bodies. When, as is also the case with the apparatus according to the invention, use is made of polymeric viscous fluids with chain-shaped molecules, such as silicon oil with a viscosity above 0.1 Nsec/m$^2$, the viscosity falls by rising shear velocity in the fluid. Thanks to this the transmitted torque, which is the product of the viscosity times the shear velocity, becomes more constant. This characteristic is known in itself but generally cannot be made use of in known apparatus since this characteristic is lost with higher temperatures and with turbulence in the fluid. An explanation of this phenomenon may be that the viscosity falls as a result of a gradually occurring ordering of the long molecules of the fluid under influence of the laminar flow, which phenomenon acts against the natural thermal disorder. With higher temperatures and with (local) turbulence, this order rapidly will be lost. An apparatus of this type is known from British patent specification 871,131.

According to the present state of art which makes use of viscous shear forces, in some cases cooling is insufficient, resulting in a temperature rise to such levels that the order, which would have been present if said fluids would have been used, would be lost. In other cases the fluid is cooled, which can be done along two methods. Either turbulences are created in the fluid to have the fluid transmit its heat to the confining walls of the apparatus and from there to ambient surroundings; or the fluid is changed continuously and cooled outside the apparatus. In both cases the order in the molecules is lost. In the first case by the turbulence per se, in the second case due to the fact that the necessary flow of the fluid for a good cooling should be so large that the stay-time of the fluid under laminar conditions is too short to come to sufficient ordering of the molecules.

In addition the apparatus according to the invention should therefore be able to carry away the generated heat from the laminar flowing fluid, but in doing so without disturbing the order in the molecules. With said fluids the viscosity does not adapt itself at once to the shear velocity. In case of relative fast changes of the shear velocity, for instance due to a fast change of the relative speed or slip, the viscosity of the fluid will remain constant during a short period of approximately 0.1 to 0.3 sec. During this time the torque transmitted will therefore change linearly with a change of the slip. Only some time after the torque transmitted will gradually become constant, at a value which is independent of the slip. This characteristic is of importance mainly when the apparatus is used as automotive brake. In case of sudden or relative fast changes, for instance: reduction, of the speed of the wheel (slip) the braking force will fall linear, therefore faster than the reduction of the coefficient of friction between the wheel and the road surface under the given lower speed of the wheel. Thus each beginning wheel slip will immediately be counteracted.

An object of the invention is to give a solution to have the apparatus controllable from outside, retaining the laminar and therefore tangential flow without turbulence and therefore without radial flow component. The apparatus of the said type is according to the invention charaterized in that the perforations are evenly distributed over the total active surface, in that, at one hand, the active gap and at the other hand the perforations including the flowpaths have such dimensions that the resistance to flow in radial direction through the active gap is several times the resistance through both the perforations and the flowpaths or vice versa, in order to create and maintain in the active gap generally a tangential flow of the fluid without an effective radial flow component, and in that the control of the transmitted torque can be done from outside by influencing the amount of fluid present in the active gap, this being done by filling said gap with fluid or withdrawing it therefrom through the perforations and the flowpaths.

In connection with the above, it is known to control the torque to be transmitted by varying the amount of viscous fluid present in the active gap between both bodies. By the high viscosity and the necessary reduced width of the gap in fact, this control becomes a greater problem. British patent specification No. 864,664 shows one of the known means with automatic control. It is also known to add circulation canals in order to induce a toroidal fluid flow to increase heat transmission, which also can be adopted to supply or withdraw the fluid, which fluid handling is assisted in doing so. From the above it will be clear that the induced turbulences disturb the order of the fluid molecules and consequently maintain the viscosity of the fluid on a constant value. Against the object of the apparatus according to the invention, the torque transmitted will be linearly dependent of the slip between the input and output parts.

It has been found according to the invention that it is possible to perforate one of both parts such that the laminar order of the passing flow of fluid molecules in the gap will not be lost, whereas through these perforations fluid can be supplied or withdrawn at a high rate through flow paths which do not directly contribute to the transmission of the torque (so-called non-active flow paths). In materializing the above described inventive ideas, the resulting apparatus should answer to the following criteria:

(a) the fluid should have as one of its properties the fact that the viscosity should be reduced when the shear velocity rises. For instance silicon-based fluids can be used when they have a viscosity over 0.1 Nsec/m$^2$ and other viscous polymers with an elongated chain, (b) the flow of fluid in the active gap should be laminar and generally tangential. To create and maintain this, the width d of the gap and the viscosity $\eta$ of the fluid should be such that under all possible rotational speeds v the Reynold's number Re should be less than 200 (Re = v.d/$\eta$), (c) the torque transmitting surface should be smooth; sudden transitions in the width of the gap would create turbulences which would spoil the order within the molecules, (d) for the same reason the perforations should be small in tangential direction and correctly shaped as regard flow hydrodynamics. Sintered plates with a diameter of the pores of 0.1 to 0.5 mm. have been found to be well suited, (e) the perforations should be evenly distributed over the active surfaces of the perforated plate in order to contribute to an as even as possible distributed supply or withdrawal of the fluid, in order to avoid more than neglegible radial-directed flow components to develop, (f) the flow resistance in the flowpaths for the supply and the withdrawal, including the same of the perforations, should be a number of times smaller than the flow resistance in the active gap, in order to ensure that all transport of fluid, apart from the torque transmitting laminar tangential flow, will take place outsie of the active gap, (g) that to this effect there should be flowpaths for the supply and the withdrawal of the fluid through which the fluid can be transported to and fro the active gap in a generally radial direction.

Thanks to the fact that the apparatus works in the laminar flow area of the fluid, the following formula is valid for the transmitted torque:

$M = n \cdot c \cdot \eta \cdot \omega / d \, (R^4 - r_{fl}^4)$
M = transmitted torque
n = number of active gaps
c = a constant
$\eta$ = viscosity
$\omega$ = relative angle velocity
d = width of active gap
R = maximum radius of active gap
$r_{fl}$ = internal radius of fluid ring in the active gap.

When $\omega$ (relative angle velocity) is changing relatively fast, $\eta$ will remain constant until some (short) time after. When $\omega$ is constant (independent of the value of $\omega$) $\eta$ will adapt itself to the value of $\omega$, resulting in M remaining generally constant.

From this formula it follows that the control of the transmitted torque can take place rapidly because $f_{fl}$, according to the formula, is present to the fourth power. A very small change in radial dimension of the fluid ring in the active gap has a big influence on the transmitted torque.

Futher characteristics of the invention will become clear from the following description of the drawings of a preferred embodiment of the apparatus according to the invention.

FIG. 1 illustrates the invention in its most simple form. The driven shaft 4 is couple to a flat perforated rotor disc 3 and is surrounded by a housing with walls 2, forming two gaps 5 and 6 at both sides of the rotor, one gap 6 of which has a width which is appreciably larger then the gap 5. The narrow, active gap 5 has a width is preferably between 0.1 and 0.5 mm. The rotor is made of sintered metal or correspondingly perforated and so smooth that the fluid film in the narrow gap 5 flows laminar without local turbulences. The other wall 2 of the active gap is smooth as well.

Supply or withdrawal of the viscous fluid can take place through an opening on the circumference of the housing, for instance controlled by a fluid pump. The fluid flows, possibly turbulent, through the large gap 6 and reaches through the perforations in the rotor the active gap in which an undisturbed laminar tangential flow will develop between the rotating rotor and the housing. Thanks to this flow by far the biggest part of the torque is transmitted from the shaft and the rotor by the fluid film to the housing.

Cooling of the oil in the active gap can take place either by cooling the walls of the housing, or by maintaining a flow of relative cold fluid in the large gap 6. This fluid flow in the "non-active" gap should preferably be turbulent to promote a good heat transfer. By the large width of the non-active gap the fluid flow in this gap does hardly contribute in the transmission of the torque by the apparatus.

The flow in the non-active gap can be promoted be feeding the fluid centrally into the rotor and by withdrawing it at the circumference of the housing. When the apparatus is cooled by throughflow of the working fluid, the transmitted torque will be controlled, as is known in itself, by controlling both fluid supply and withdrawal in relation to each other, in order to keep $f_{fl}$ (see formula) controllable.

In the active gap the temperature of the fluid is relatively low and constant (independent of the speed) thanks to the intense cooling. By this and by the laminar flow in the active gap according to the invention, the said effect will develop, in that the viscosity drops when the shear velocity rises. The transmitted torque which is a linear function of the product of viscosity times shear velocity, remains generally constant over a wide range of constant or slowly varying relative speeds.

FIG. 2 is an illustration of another embodiment of an apparatus according to the invention. In this case two rotors 3' are mounted in a torque transmitting way on shaft 4', which rotors rotate small distance from the walls 2' of the surrounding housing and are at an appreciably larger distance from each other.

Also in this embodiment the rotors are evenly perforated over their total surface, enabling the fluid to flow through the non-active gap 6' and the perforations into and from the active gaps 5'. Cooling again can take place through the walls 2' of the housing and/or by maintaining a fluid flow through the non-active gap.

Compared with the apparatus according to FIG. 1 the apparatus according to FIG. 2 can transmit a larger torque. Furthermore the mean velocity in the non-active gap is larger, resulting in a higher velocity with which the fluid can be withdrawn. This is of importance when the transmitted torque should be reduced and also when cooling should take place with the help of fluid flow in the non-active gap.

The embodiment according to FIG. 1 produces a large axial force working between the rotor and the housing, which is compensated internally with the embodiment according to FIG. 2.

FIG. 3 illustrates a special embodiment of the apparatus according to FIG. 2. The housing 1" consists of an axial stack of rings 1a and 1b. With tie rods running through the bores 12 these rings together with the end covers are tightened together. In between subsequent rings a nonperforated plate 2" is clamped. Two double rotors 3" are, according to the illustration, in a torque resisting way with splines 3c fitted on the nonillustrated shaft 4". In the figure only one intermediate wall 2" of the housing is illustrated. This wall functions as non-perforated plate and is made hollow, in order to have the cooling fluid flow through its cavity 10. Heat transfer may be promoted with the help of cooling fins 11.

FIG. 4 shows the embodiment of FIG. 3 in planar cross-section, the upper half of FIG. 4 illustrating the cooling cavity 10 and the lower half showing the perforated plate 3". FIG. 3 in relation to FIG. 4 is a section taken along lines III—III.

The cooling fluid is supplied through an axial bore 8 in the housing wall 1" and distributed through at least one bore 9 per intermediate wall 2". At another advantageous position with regard to circulation of the fluid through the cavity in the intermediate wall 2", situated on the circumference of the housing, the cooling fluid is withdrawn again in approximately the same manner through at least one bore such as the one designated 14.

Through comparable bores such as the ones designated 9 and 14, this time in communication with the chambers 7 filled with hydraulic fluid, the transmitted torque can be controlled and the fluid eventually circulated for cooling purposes.

In the double rotor a great number of perforations 3a, which are small in tangential direction, are evenly distributed over the active surface. Said perforations enable the supply or withdrawal of the fluid from the circumference of the housing through the non-active gap 6" between the rotors and through the perforations 3a into and from the narrow active gap 5" (thick line in FIG. 3) between the rotors 3" and the non-perforated plate 2".

This embodiment is of such a design that a number of rotor sets and stator plates can be combined according to the torque which should be transmitted as maximum. The rotors can be fitted to the shaft in a self aligning way as regards the axial position.

Figure 5A:
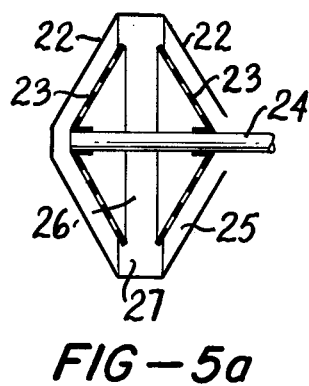
Figure 5B:
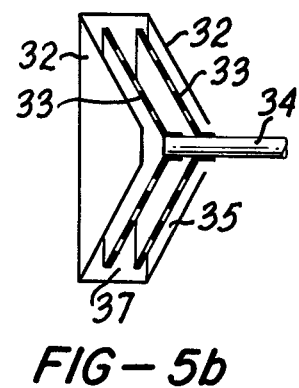

In another embodiment of the invention, the plates are complementarily conically shaped such as the perforated plates 23 or 33 and non-perforated plates 22 or 32 shown respectively in FIGS. 5a and 5b.

In addition to the above described embodiments, it will be understood that persons skilled in the art may make variations and modifications without departing from the spirit and scope of the invention. All such modifications and variations are intended to be within the scope of the invention as defined in the appended claims.

I claim:

1. A transmission apparatus capable of controlled transmission of torque by making use of the shear resistance in a laminar flow of hydraulic fluid in an active gap between the opposing active surfaces of two mutually rotating parallel bodies, comprising a torque-transmitting plate and a corresponding driven plate, one of said plates being perforated and having one side thereof disposed as an active surface and the other side as a non-active surface, and a flowpath communicating with the active plate surface through the perforations and the non-active side of the perforated plate, and the other of said plates having an opposing non-perforated active surface that is spaced apart from the active surface of the perforated plate by an active gap, wherein the active gap, the perforations, and the flowpath are so arranged and have such dimensions that the resistance to fluid flow in a radial direction through the active gap is several times the resistance to flow through the perforations and the flowpath in order to create and maintain in the active gap generally a tangential, laminar flow of the fluid without an effective radial flow component.

2. The transmission apparatus according to claim 1 further comprising means for supplying and withdrawing fluid to and from the active gap through the perforations and the flowpath such that the transmitted torque can be externally controlled by influencing the amount of fluid present in the gap.

3. The transmission apparatus according to claim 1, wherein the width of the active gap is between 0.1 and 0.5 mm and preferably between 0.2 and 0.3 mm.

4. The transmission apparatus according to claim 1, wherein the perforations consist of a plurality of openings of which the tangential dimensions are small in comparison to the tangential distances between the openings, and which are evenly distributed over the active surface of the plate.

5. The transmission apparatus according to claim 1, wherein the plate is made of a porous sintered material having the perforations evenly distributed over the active surface of the plate.

6. The transmission apparatus according to claim 1, further comprising a housing, a shaft carried in and extending from the housing, and a plurality of pairs of mutually rotating plates, each of said pairs of plates consisting of one perforated and one non-perforated plate, wherein the pairs of plates are connected in parallel to transmit the torque, and all perforated plates are fitted to the shaft in a torque transmitting way and all non-perforated plates are fitted to the housing, or vice versa.

7. The transmission apparatus according to claim 1, further comprising a housing for the plates having at least one opening at its circumference for the supply or withdrawal of the fluid for torque control purposes.

8. The transmission apparatus according to claim 1, having a perforated plate spaced between two non-perforated plates, wherein the flowpath is shaped as a wide non-active gap between the perforated plate and one of the non-perforated plates.

9. The transmission apparatus according to claim 8, wherein the perforated plate is disposed axially with regard to the two neighbouring non-perforated plates such that the distance of the perforated plate from one non-perforated plate is at least a few times larger than the distance from the other non-perforated plate.

10. The transmission apparatus according to claim 1, having two perforated plates positioned adjacent to each other such that the axial distance between the two plates forms a gap which is a few times larger than the active gap between each perforated plate and a corresponding non-perforated plate.

11. The transmission apparatus according to claim 1, having two perforated plates joined to form a plate unit with a flowpath therebetween running from the generally axially oriented perforations of the two plates in a radial direction between the two plates to the circumference of the plate unit such that the flowpath together with all perforations produce a flow resistance to the fluid which is at least a few times smaller than the flow resistance in the active gaps at the active surfaces of the perforated plate unit.

12. The transmission apparatus according to claim 1, having non-perforated plates at least partially spaced apart and fitted with cooling fins, and means for circulating fluid through a separate, fluid-cooling circuit for the internal cooling of the non-perforated plates.

13. The transmission apparatus according to claim 1, having perforated plates spaced apart for providing a flowpath therebetween wherein the radially oriented flow of fluid through the non-active flowpath is applied for the internal cooling of the perforated plates.

14. The transmission apparatus according to claim 1, wherein the perforated and non-perforated plates are complimentarily conically shaped.

15. A transmission apparatus capable of controlled transmission of torque by making use of the shear resistance in a laminar flow of hydraulic fluid in an active gap between opposing active surfaces of a driving body and a driven body, comprising a plural set of driving plates and a corresponding set of driven plates, the plates of one of said sets being perforated and paired in spaced apart relation to each other such that the outwardly facing sides of each pair are disposed as active surfaces and the interior space between each pair is non-active, the plates of the other of said sets being non-perforated and paired in spaced apart relation to each other such that the outwardly facing sides of each pair are disposed as active surfaces and the space between each pair is non-active, said pairs of plates being alternately axially disposed with at least a non-perforated pair between two perforated pairs, or vice versa, such that the outwardly facing active surfaces of the one set form active gaps with the opposing active surfaces of the other set, and flowpaths communicating with the active surfaces of the perforated plates through the perforations and the interior spaces between paired perforated plates for the supply or withdrawal of hydraulic fluid, wherein the active gaps, the perforations and flowpaths, including interior spaces, of the perforated plates are so arranged and have such dimensions that the resistance to fluid flow in a radial direction through the active gaps is several times the resistance to flow through the perforations and flowpaths in order to create and maintain in the active gaps generally a tangential, laminar flow of the fluid without an effective radial flow component.

* * * * *

UNITED STATES PATENT AND TRADEMARK OFFICE
CERTIFICATE OF CORRECTION

PATENT NO. : 4,157,748
DATED : June 12, 1979
INVENTOR(S) : Joseph M. E. Beaujean It is certified that error appears in the above-identified patent and that said Letters Patent are hereby corrected as shown below:

First Page, Item [57], Line 16 of ABSTRACT, after "gap", delete "at";
Column 1, Line 13, "connects with" should read --connects the--;
Column 1, Line 41, "controllably" should read --controllable--;
Column 2, Line 2, "in known" should read --in the known--;
Column 2, Line 55, "charaterized" should read --characterized--;
Column 3, Line 47, "regard" should read --regards--;
Column 3, Line 60, "outsie" should read --outside--;
Column 4, Line 16, "$f_{f1}$" should read --$r_{f1}$--;
Column 4, Line 30, "then" should read --than--;
Column 4, line 54, "be" second occurrence, should read --- by ---;
Column 4, Line 60, "$f_{f1}$" should read --$r_{f1}$--; and
Column 5, Line 6, after "rotate", insert --a--.

Signed and Sealed this

Ninth Day of October 1979

[SEAL]

Attest:

RUTH C. MASON
*Attesting Officer*

LUTRELLE F. PARKER
*Acting Commissioner of Patents and Trademarks*